United States Patent
Segato

(10) Patent No.: US 8,568,641 B2
(45) Date of Patent: Oct. 29, 2013

(54) COMPOSITE MATERIAL HUMAN BODY SUPPORT AND PROCESS FOR MAKING SAME

(75) Inventor: Stefano Segato, Vicenza (IT)

(73) Assignee: Selle Royal S.p.A., Pozzoleone (IT)

( * ) Notice: Subject to any disclaimer, the term of this patent is extended or adjusted under 35 U.S.C. 154(b) by 46 days.

(21) Appl. No.: 12/607,233

(22) Filed: Oct. 28, 2009

(65) Prior Publication Data

US 2010/0044915 A1    Feb. 25, 2010

Related U.S. Application Data

(62) Division of application No. 12/293,429, filed as application No. PCT/IB2007/050941 on Mar. 19, 2007.

(30) Foreign Application Priority Data

Mar. 21, 2006   (IT) .......................... VI2006A000080

(51) Int. Cl.
B29C 65/02      (2006.01)

(52) U.S. Cl.
USPC ........................... 264/259; 264/241; 264/250

(58) Field of Classification Search
USPC ......................................... 264/241, 250, 259
See application file for complete search history.

(56) References Cited

U.S. PATENT DOCUMENTS

| | | | |
|---|---|---|---|
| 3,230,007 A * | 1/1966 | Spangler et al. | 297/244 |
| 3,797,887 A * | 3/1974 | Barecki et al. | 297/452.19 |
| 4,761,843 A | 8/1988 | Jay | |
| 5,169,469 A | 12/1992 | Feeley | |
| 5,397,162 A | 3/1995 | Huang | |
| 6,409,865 B1 | 6/2002 | Yates | |
| 6,645,336 B1 * | 11/2003 | Albertone et al. | 156/247 |
| 6,676,785 B2 * | 1/2004 | Johnson et al. | 156/92 |
| 2004/0241479 A1 | 12/2004 | Domine | |
| 2009/0061146 A1 | 3/2009 | Segato | |

FOREIGN PATENT DOCUMENTS

| | | |
|---|---|---|
| EP | 1382520 | 1/2004 |
| GB | 2224248 | 5/1990 |
| WO | 2004031025 | 4/2004 |
| WO | 2006085202 | 8/2006 |

OTHER PUBLICATIONS

PCT, International Search Report of parent application, Feb. 25, 2008.
PCT, Written Opinion of the International Searching Authority of the parent application, Feb. 25, 2008.
PCT, International Preliminary Report on Patentability, Feb. 25, 2008.

* cited by examiner

*Primary Examiner* — Galen Hauth
(74) *Attorney, Agent, or Firm* — Themis Law

(57) ABSTRACT

A human body support includes a composite material base frame having a top surface and a bottom surface, and a cover element formed from a first polymer material associated to the base frame. The support also includes a film of a second thermoplastic polymer material, which is fixedly attached to the base frame. The second thermoplastic material has an affinity for the first polymer material so that the cover element may be fixedly attached to the base frame, thereby forming an integral support. A polyurethane gel may be disposed in a recess of the base frame. The first polymer material has a thickness of 0.1 to 0.3 mm, the second material has a thickness of 0.01 to 0.025 mm, and both may be optically transparent.

11 Claims, 3 Drawing Sheets

COMPOSITE MATERIAL HUMAN BODY SUPPORT AND PROCESS FOR MAKING SAME

CROSS-REFERENCE TO RELATED APPLICATIONS

The present application is a divisional application of U.S. application Ser. No. 12/293,429 submitted to the U.S. Patent and Trademark Office on Sep. 18, 2008 and having a filing date of Sep. 27, 2008, which is a national stage application of international application PCT/IB2007/050941 having an international filing date of Mar. 19, 2007, which claims priority to Italian application VI2006A000080 having a filing date of Mar. 21, 2006, the entireties of which are hereby incorporated by reference.

FIELD OF THE INVENTION

The present invention is applicable to the field of sport and leisure accessories, and more particularly relates to a composite material human body support and to a process for making the same.

Typical examples of supports that can be formed according to the present invention include seat backrests, headrests, armrests and seats for anatomic chairs, especially designed for elderly and physically challenged people, footwear insoles, orthopedic and non-orthopedic mattresses, saddles and handlebars for bicycles, cycles, motorcycles and the like.

BACKGROUND OF THE INVENTION

Elastic supports of the above type are known to generally comprise a composite material base frame, a pad element made of a resilient material, usually expanded foam resin and/or gel, and a sheet cover element, which is designed to contact a seated user.

Typically, the frame of such supports is formed by in-mold hot curing of a thermosetting resin with one or more "skins" of fibrous material, such as carbon, fiberglass, Kevlar or the like embedded therein. The skins of fibrous material may be either dry or preimpregnated with the thermosetting resin when placed into the mold; when the fibrous material is dry, the thermosetting resin is directly injected into the mold.

When the cover element is formed of a polymer material due to aesthetic or light-weight requirements, a problem arises with the attachment of the composite material of the frame to the polymer material of the cover element.

International application PCT/IB2006/000144 discloses a composite material support structure, in which the cover element is co-molded with the composite material frame, so that the cover element directly contacts the resin matrix of the composite material.

In practice, this solution has the drawback of imperfect adhesion between the frame and the cover element, which affects the mechanical properties of the finished support. The lack of affinity between the resin matrix of the frame and the polymer material of the cover element causes formation of air bubbles and discontinuity at the interface between the cover element and the frame.

Thus, there still exists the problem of providing supports having a composite material frame attached to a cover element made of a polymer material, which exhibit good mechanical properties.

Another well-known problem in prior art supports is that, when cuts or recesses are to be formed on the base frame, e.g. to create peripheral comfort tabs according to the teachings of international patent publication no. WO2004031025, such processing has to occur upstream or downstream of the support molding process.

For upstream processing, the skins of fibrous material must be processed, causing cuts to be rough and inaccurate due to the nature of such material. On the other hand, downstream processing must be carried out on the wholly formed frame, causing such frame to be mechanically weakened.

U.S. Pat. No. 4,761,843 also discloses a seat cushion.

In either case, the problem of forming a composite material support of high strength with high precision processing on the frame has not been solved to date.

SUMMARY OF THE INVENTION

It is an object of the present invention is to overcome the above drawbacks by providing a human body support that is highly efficient and relatively cost effective.

Another object of the present invention is to provide a support having a composite material frame attached to a cover element made of a polymeric material, which exhibits good mechanical properties.

Another object of the present invention is to provide a practical and easily repeatable process for making a support.

Another object of the present invention is to provide a process for making a support, which provides for high precision processing on the frame while ensuring a high strength of the final product.

These and other objects, as better explained hereafter, are fulfilled by a human body support according to the present invention that includes a composite material base frame having a top surface and a bottom surface and a cover element formed from a first polymer material associated to the base frame.

In an aspect of the present invention, the support includes at least one film of a second thermoplastic polymer material, which is fixedly attached to the base frame at least at one of the top or bottom surfaces. The second thermoplastic material has an affinity for the first polymer material.

With this particular configuration, the cover element can be fixedly attached to the base frame to obtain an integral support having very good mechanical properties.

The use of a film made from a second thermoplastic material having an affinity for the first polymer material of the cover element provides for fixed attachment of the cover element to the base frame, while preventing air bubble from forming and discontinuities typically found in prior art supports.

The term "composite material" as used herein is meant to indicate a material that includes a fibrous reinforcing element, such as carbon fiber, glass fiber, Kevlar fiber or the like, embedded in a polymer matrix, usually a thermosetting resin. The reinforcing element may include one or more "skins", i.e. substantially sheet-like elements.

Furthermore, the term "affinity materials" as used herein is meant to indicate materials having a chemical and/or physical affinity for each other, i.e. materials that, while in joined relationship, provide a junction adapted to support the transfer of tensile or shear stresses through the contact surface. The highest affinity is thus achieved between identical materials.

The term "junction" as used herein, is meant to indicate the sum of adhesive strength, which is mainly of a physical nature and caused by mutual electrostatic interactions generated at the contact surface, and cohesive strength, which is mainly of a chemical nature and caused by chemical bonds generated at the contact surface.

In another aspect, the invention relates to a process of making composite material human body supports, which comprises the steps of molding a base frame having a top surface and a bottom surface, and associating a cover element made from a first polymer material to the base frame to obtain an integral human body support.

According to the invention, in the first molding step, at least one film of a second thermoplastic polymer material is fixedly attached to the base frame at least at one of the top and bottom surfaces. The second thermoplastic material has an affinity for the first polymer material.

This sequence of steps forms an easy and repeatable process of making a human body support having very good mechanical properties.

Advantageously, the process of the invention may include a step, in which the base frame is processed by removal and/or partial deformation of its base material. This step is executed upstream from the molding step and downstream from the associating step.

Thus, high precision processing may be performed on the frame while preserving the high strength of the final support.

BRIEF DESCRIPTION OF THE DRAWINGS

Additional features and advantages of the present invention will be more apparent from the detailed description of a non-exclusive embodiment of a process according to the invention, which is described as a non-limiting example and is illustrated with the enclosed drawings, in which.

DETAILED DESCRIPTION OF A PREFERRED EMBODIMENT

Figure 1:
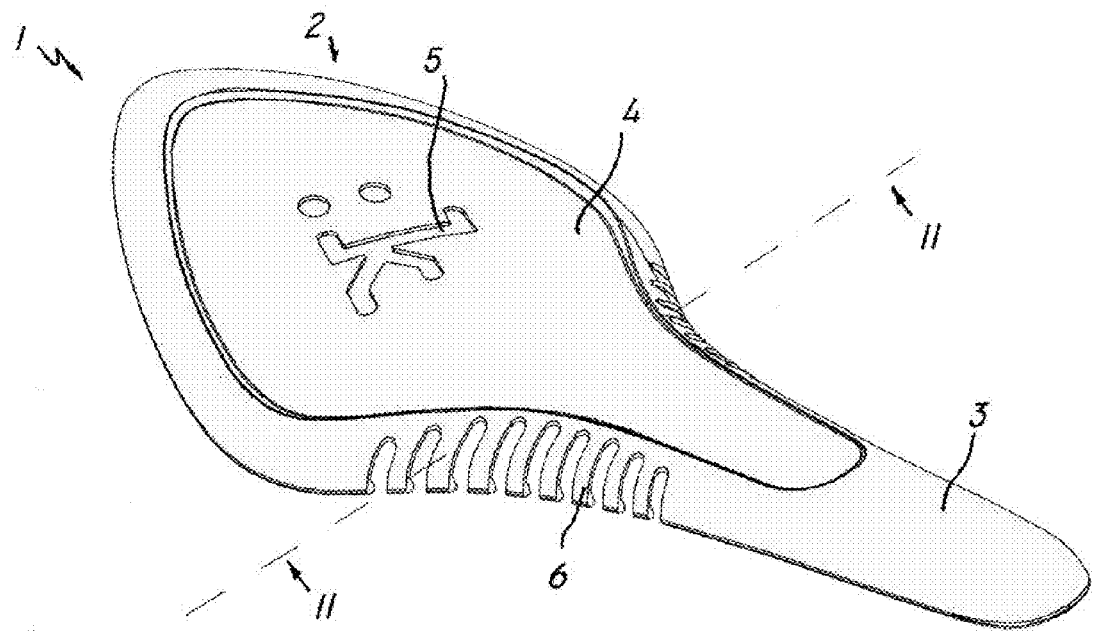
FIG. 1 is an axonometric view of a support according to the present invention.

Referring to the figures, the support of the invention, generally designated by numeral 1, comprises a base frame 2 made of a composite material with a cover element 3 made from a first polymer material.

The support may further have a pad element 4 between base frame 2 and cover element 3, which can comprise at least one layer of a resilient material, such as foam or a polyurethane gel, designed to contact a seated user.

In one embodiment, support 1 may include a decorative element 5 on frame 2, such as a carved low-relief logo 5, and/or a comfort element 6, such as a series of peripheral fins according to the teachings of patent application WO2004/031025. However, it will be understood that any other process may be carried out on frame 2, removing or at least partially deforming its base material, without departing from the scope of the invention.

Figure 2:
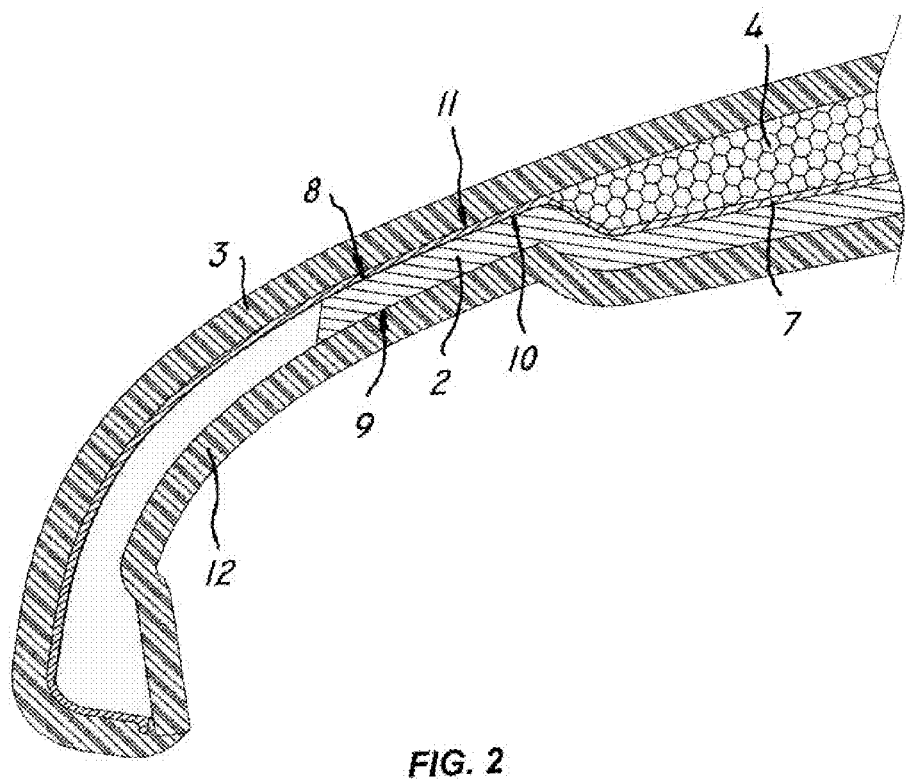
FIG. 2 is a sectional view of the support of FIG. 1 taken along a plane II-II.

As shown in FIG. 2, there is provided a film 7 of a second thermoplastic polymer material, which is stably attached to base frame 2 at its top surface 8. The second thermoplastic material of film 7 has an affinity for the first polymer material of frame 2, so that cover element 3 may be stably attached to frame 2. It will be understood that film 7 may also be attached to bottom surface 9 of frame 2 without departing from the scope of the invention.

Thus, film 7 will actually operate as a "solid glue" bridging between frame 2 and cover element 3. Film 7 has a bottom face 10 in contact with frame 2 and at least partly penetrates its resin matrix, whereas the other face 11 is free, with cover element 3 being designed to be laid thereon.

Advantageously, for maximum affinity, the second thermoplastic material the film 7 and the first polymer material of cover element 3 may be identical. In one embodiment, both the first and the second materials may be an optically transparent thermoplastic polyurethane, or may be selected from the group comprising polyester, polyamide and polymers having epoxy groups. It should be understood that any other material, whether optically transparent or not, may be used without departure from the scope of the invention.

Conveniently, film 7 may be relatively thin and have a thickness of 0.01 mm to 0.05 mm, preferably of about 0.025 mm.

Cover element 3 may include at least one layer of polymer material, having a thickness of 0.1 mm to 0.3 mm, preferably of about 0.2 mm.

It should be understood that cover element 3 may also include more than one layer, whether of a polymer material or the like, without departing from the scope of the invention. In this event the base layer, i.e. the layer in contact with film 7, is formed from the first polymer material having an affinity for the first thermoplastic material thereof.

In one embodiment, support 1 may also have an additional cover layer 12 at the bottom surface 9 of frame 2, which may be also formed from an optically transparent thermoplastic polyurethane.

As shown in FIG. 1, base frame 2 may have a recessed seat 13 designed for housing pad element 4.

Pad element 4 may be advantageously made of a viscoelastic material that has an affinity for at least one of the first polymer material of cover element 3 and/or the second thermoplastic material of frame 2.

For maximum affinity, and for optimized mechanical properties of support 1, cover element 3, film 7 of thermoplastic material and lower layer 12 may be formed of a thermoplastic polyurethane, possibly transparent for decorative element 5 to be visible, and the viscoelastic material of pad element 4 may a polyurethane gel.

A process for making support 1 has two successive steps.

In a first step, a base frame with a top surface 8 and a bottom surface 9 is molded. During this step, film 7 is fixedly attached to base frame 2 under heat, e.g. by co-molding in a first mold 14, possibly having a protrusion 15 for forming receptacle 13 on frame 2.

It should be understood that film 7 of thermoplastic material may be laid either on upper surface 8 or on bottom surface 9 without departure from the scope of the invention.

Next, a step may take place, in which cover element 3 is associated to base frame 2, with the film previously attached thereto, and possibly to pad element 4. This step may occur in a second mold 16, which may be other than first mold 14. However, it should be understood that the above described steps of the inventive process may take place in one mold, without departure from the scope of the invention.

Figure 3:
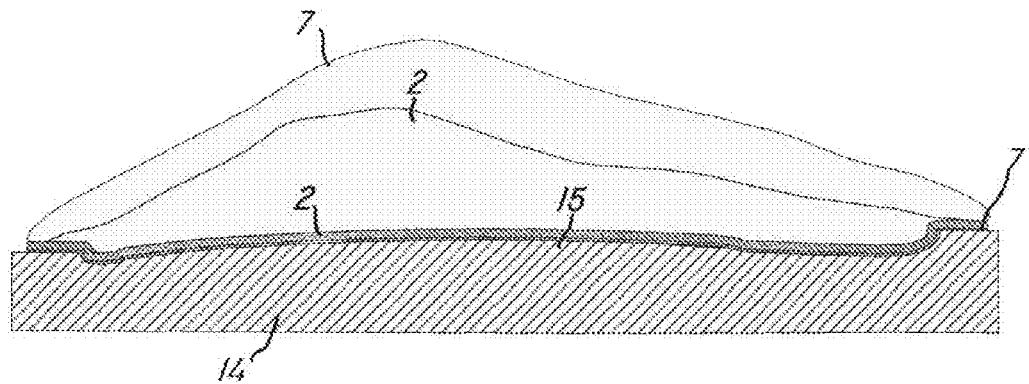
FIG. 3 is a sectional view of a step of the process of the invention.
Figure 4:
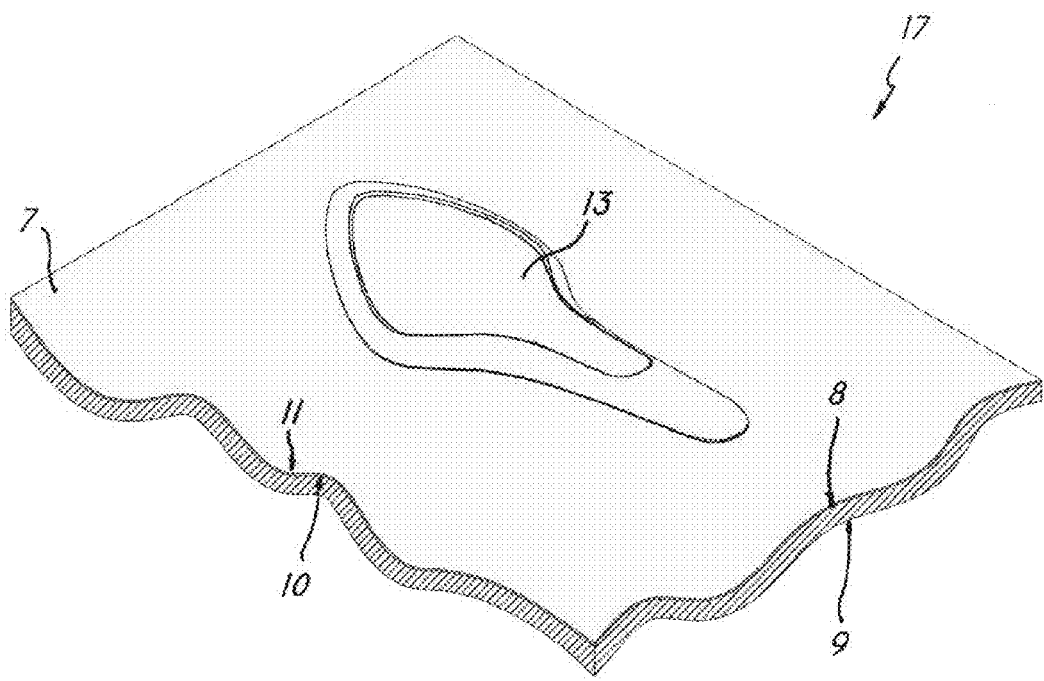
FIG. 4 is an axonometric view of a frame in an intermediate process step.
Figure 5:
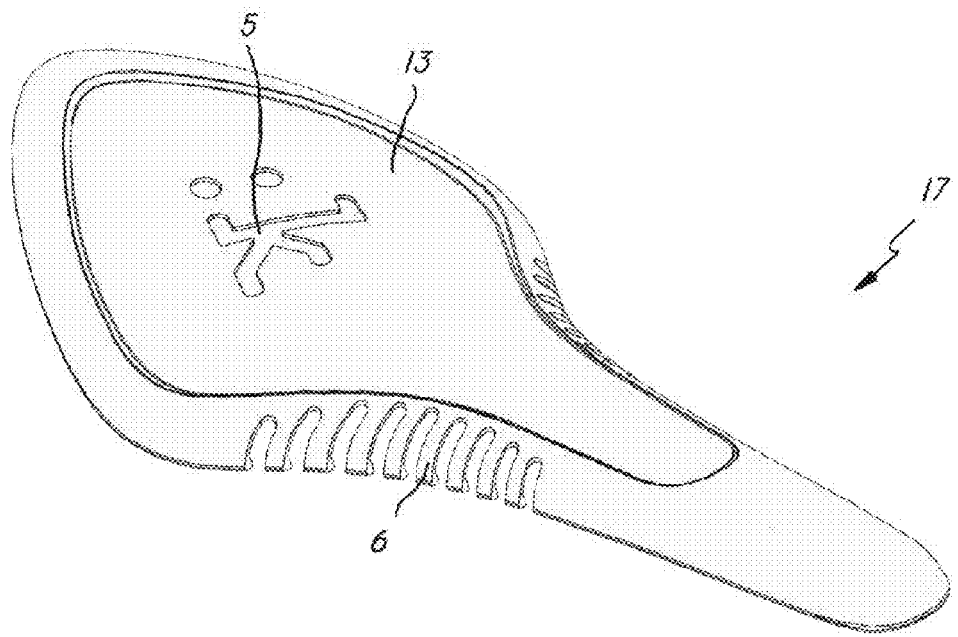
FIG. 5 is another axonometric view of a frame in an intermediate process step.
Figure 6:
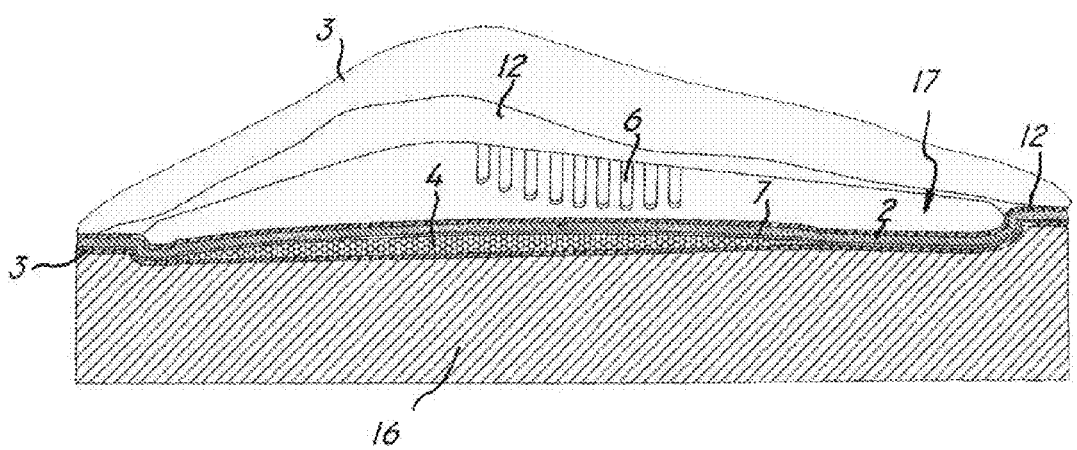
FIG. 6 is a further sectional view of a step of the process of the invention.

In one embodiment, the reinforcing element of the frame may be introduced in first mold 14, in a dry or preimpregnated state, in combination with film 7, as shown in FIG. 3. The reinforcing element may include one or more "skins" of a fibrous material, such as carbon fiber, Kevlar fiber, glass fiber or the like.

Thus, an intermediate frame 17 is formed, which is removed from the mold and may be submitted to a processing step by removal and/or at least partial deformation of its base material, e.g. to form peripheral fins 6 or decorative element 5.

Advantageously, this processing step may be executed with CNC machines and by a cutting process such as chip formation, cutting, laser cutting, water-jet cutting or the like, with computer-controlled equipment.

It should be understood that the term "intermediate frame" as used herein is meant to indicate frame 2 in the intermediate process step after the above described first and last steps.

In one embodiment, the step of laying film 7 of thermoplastic material takes place before forming intermediate frame 17, i.e. by laying film 7 directly on the reinforcing element, in either a dry or a preimpregnated state, and before introducing the reinforcing element and possibly the polymer matrix in the mold.

It should be understood that such step may be also separated in time from the first molding step, e.g. occur the day before, and a more or less extended step in which the reinforcing element-thermoplastic film assembly is at rest may be also provided, without departure from the scope of the present invention.

Otherwise, the laying up of thermoplastic film 7 may occur after forming intermediate layer 17, by laying film 7 on an at least partly cured intermediate layer 17, without departure from the scope of the invention.

In either case, first mold 14 may be heated to the incipient melting temperature of the resin that forms the matrix of the frame. Thus, film 7 of thermoplastic material starts to soften and penetrates the resin, until it is at least partly embedded therein, and thence fixedly attached thereto.

It should be further understood that a finishing step may be provided for intermediate layer 17, which contemplates, for instance, removal of the base material exceeding the size of frame 17, without departure from the scope of the present invention.

Advantageously, the polymer matrix may be associated to the reinforcing element by impregnation prior to laying up in mold 14, e.g. by an impregnation step in another mold or anyway separately.

It should be understood that, if support 1 also incorporates pad element 4, any process for attaching frame 2 thereto may be used without departing from the scope of the invention. As a non-limiting example, pad element 4 may be formed separately and bonded or heat-sealed to frame 2, or obtained by co-molding with frame 2.

FIG. 2 shows a sectional view of support 1, as taken along a plane //-//. As shown in FIG. 2, frame 2 is covered by an overlying thermoplastic film 7, cover element 3 being bonded thereon. Lower cover layer 12 is bonded to bottom surface 9.

Suitably, frame 2 and cover element 3 may be integrally associated to each other by heating second mold 16 to a predetermined temperature, possibly the incipient melting temperature of the polymer material of cover element 3. During this step, a junction will be formed between film 7 and cover element 3.

The above disclosure clearly shows that the support and process of the invention fulfill the intended objects and particularly meet the requirement of providing supports having a composite material frame attached to a cover element made from a polymer material that exhibits very good mechanical properties.

The support and process of this invention are susceptible of a number of changes and variants, within the inventive principle disclosed in the appended claims. All the details thereof may be replaced by other technically equivalent parts, and the materials may vary depending on different needs, without departing from the scope of the invention.

While the support and the process have been described with particular reference to the accompanying figures, the numerals referred to in the disclosure and claims are only used for the sake of a better intelligibility of the invention and shall not be intended to limit the claimed scope in any manner.

What is claimed is:

1. A process of making composite material human body supports comprising the steps of:
    molding a base frame of a composite material having a top surface and a bottom surface, the composite material comprising one or more skins of a fibrous material embedded in a polymer matrix that includes a thermosetting resin; and
    thereafter, associating a cover element made of at least one layer of a first polymer thermoplastic material to the molded base frame to form an integral human body support;
    wherein the step of molding the base frame comprises causing at least one film of a second thermoplastic material to become stably attached to the base frame at least at one of the top or bottom surfaces, the second thermoplastic material being selected to be thinner than the at least one layer of the first thermoplastic material, the second thermoplastic material being selected to have one or more of a physical or chemical affinity for the first polymer thermoplastic material to provide a junction therebetween such that the cover element is stably attached to the base frame, and
    wherein the at least one film of the second thermoplastic material is at least partly embedded in the polymer matrix of the base frame such that a top or bottom face of the at least one film of the second thermoplastic material is fixedly attached to the top or bottom surface of the base frame.

2. The process of claim 1, wherein the step of molding the base frame consists in introducing the reinforcing element in combination with the at least one film of the second thermoplastic material in a first mold.

3. The process of claim 2, wherein the attachment of the at least one film of the second thermoplastic material to the base frame comprises heating the first mold to a first predetermined operating temperature.

4. The process of claim 3, wherein the first predetermined operating temperature is an incipient melting temperature of the second thermoplastic material.

5. The process of claim 3, wherein the first mold comprises a protrusion for forming a recessed seat on the base frame, the recessed seat being configured to house a pad element.

6. The process of claim 1, wherein the step of associating the cover element is performed using a second mold, the base frame being placed within the second mold and being fixedly attached to the film of the second thermoplastic material in combination with the cover element.

7. The process of claim 6, wherein the step of associating the cover element to the base frame is performed by heating the second mold to a second predetermined operating temperature.

8. The process of claim 7, wherein the first polymer material is thermoplastic, and wherein the second predetermined operating temperature is a temperature of starting a melting of the first polymer material.

9. The process of claim 1, further comprising the step of machining the base frame to one or more of remove or to at least partially shape a base material of the base frame, the step of machining being executed after the step of molding the base frame and before the step of associating the cover element.

10. The process of claim 9, wherein the step of the machining is executed with a CNC machine.

11. The process of claim 10, wherein the step of machining is a cutting process selected from the group consisting of chip formation, knife cutting, laser cutting, or water-jet cutting with computer-controlled equipment.

* * * * *